(12) United States Patent
Klebanov et al.

(10) Patent No.: US 6,300,007 B1
(45) Date of Patent: *Oct. 9, 2001

(54) LEAD ALLOY FOR LEAD-ACID BATTERY TERMINALS

(75) Inventors: Lena N. Klebanov, Bayside; Christian P. Hansen, Eagle; David A. Wynn, Glendale; Glenn M. Trischan, Brown Deer; Charles J. Schaeffer, Wauwatosa, all of WI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,703

(22) Filed: Oct. 30, 1998

(51) Int. Cl.$^7$ .............................. H01M 2/30; H01M 2/32; C22C 11/10
(52) U.S. Cl. .......................... 429/178; 429/179; 420/569
(58) Field of Search .............................. 420/569; 429/178, 429/179

(56) References Cited

U.S. PATENT DOCUMENTS

| 3,377,259 | 4/1968 | Phillips . |
| 3,673,152 | * 6/1972 | Minagawa et al. . |
| 3,879,217 | 4/1975 | Peters . |
| 5,508,125 | 4/1996 | Bantz et al. ........................ 429/160 |

FOREIGN PATENT DOCUMENTS

| 8100996 | 10/1982 | (BR) . |
| 0855753 A1 | 7/1998 | (EP) . |
| 1401479 | 7/1975 | (GB) . |
| 1 439 887 | 6/1976 | (GB) . |
| 04 002055 | 1/1992 | (JP) . |
| WO 95/26052 | 9/1995 | (WO) . |

OTHER PUBLICATIONS

English Translation of Brazilian Patent Application No. 8100996 (Oct. 1982).
English Translation of Japanese Patent Application No. 04 002055 (Jan. 1992).
G.W. Vinal, A General Treatise on the Physics and Chemistry of Secondary Batteries and their Engineering Applications, Storage Batteries, 4th ed., 1955, pp. 15–18.
Kallup, B.E.; Berndt, D.; Selenium—An Important Additive For Lead–Acid Battery Alloys, Proc. Electrochem. Soc. (1984), 84–14 (Adv. Lead–Acid Batteries), 214–23.
Gillian, W.F., Trends in Lead/Acid Battery Alloy Use and Metallurgy, J. Powers Sources (1987), 19(2–3), 133–42.
Osawa, Z., Ishizuka, T., Catalytic Action of Metal Salts in Autoxidation and Polymerization. X. The Effect of Various Metal Stearates on the Thermal Oxidation of 2,6,10,14–Tetramethylpentadecane, Journal of Applied Polymer Science, vol. 17, pp. 2897–2907 (1973).
Matisova, Rychla, L., Rychly, J., Vavrekova, M., Thermo–Oxidation of Polypropylene in the Presence of PbO, Polymer Degradation and Stability vol. 2, pp. 187–202 (1980).

(List continued on next page.)

Primary Examiner—Stephen Kalafui
Assistant Examiner—Jonathan Crepeau
(74) Attorney, Agent, or Firm—Quarles & Brady LLP

(57) ABSTRACT

An alloy for casting terminals for lead-acid batteries which has good corrosion resistance, produces less dross during manufacturing, has resistance to polypropylene degradation, as well as other improved features. The alloy is composed of antimony present in the range of about 2.5–4.75%; arsenic present in the range of about 0.15–0.35%; tin present in the range of about 0.23–0.6%; copper present in the range of about 0–200 ppm; sulfur present in the range of about 0–40 ppm and the balance lead. In an alternative embodiment, copper and sulfur are replaced with selenium in the range of about 40–90 ppm.

19 Claims, 2 Drawing Sheets

OTHER PUBLICATIONS

ASTM Test Method D3895 (1980); Standard Test Method for Oxidative Induction Time of Polyolefins By Thermal Analysis[1], Secs. 1–10 and A1.1–A1.3.6.

Maier, C., Calafut, T., Polypropylene: The Definitive User's Guide and Databook, Plastics Design Library, 1998, Section 3.3.

* cited by examiner

LEAD ALLOY FOR LEAD-ACID BATTERY TERMINALS

BACKGROUND OF THE INVENTION

1. Technical Field

The field of invention is lead-acid storage batteries. More particularly, it relates to an improved alloy for producing side terminals for these batteries.

2. Background Art

A lead alloy commonly used to make terminals for lead-acid storage batteries is composed of 2.75–3.25% antimony, 0.05–0.20% arsenic, 0.15–0.40% tin, 400–600 ppm copper, less than 30 ppm sulfur and less than 20 ppm selenium. Actual composition specifications for the referenced alloy are those placed into the caster, rather than the finished bushing composition. When parts were produced by gravity casting at temperatures typically above 800° F., this necessitated the use of grain refiners (Cu, S, and/or Se) for suitable metallurgical structure. When parts are produced via a die casting process typically at temperatures below 800° F., such grain refiners (Cu, S, and/or Se) form dross and are reduced or completely lost from the finished part. Unwanted reductions in other alloying elements can occur as dross forms. Drossing losses are an expense that is figured into the bushing cost.

Side terminal bushing properties that are important to safety and functional performance are nut rotation, weldability, weld torque, age hardening, and corrosion resistance. Particularly in hot climate areas which accelerate corrosion processes, improved corrosion resistance is desirable for extended product life and performance. A hypothesis of corrosion sensitivity was developed, which involves the composition of the bushing alloy, welding temperatures (particularly at the lead-to-poly interface), and catalytic or protective interaction of alloy components in the degradation of polypropylene container, and associated lead alloy corrosion due to the interaction of polypropylene decomposition products and lead alloys.

Thus, there is a need for an improved alloy for manufacturing terminals in lead-acid storage batteries.

The objects of the invention therefore include:

a. providing an alloy for manufacturing terminals for lead-acid storage batteries which have reduced drossing during die casting operations;

b. providing an alloy of the foregoing type which reduces material losses and cost of recycling;

c. providing an alloy of the foregoing type which has improved composition stability due to reduced pull-out of alloy components;

d. providing an alloy of the foregoing type which has improved compatibility with polypropylene at elevated temperatures by reducing copper, which catalytically oxidizes polypropylene and increasing tin, which provides anti-oxidant protection to polypropylene;

e. providing an alloy of the foregoing type which has improved grain refinement for the terminal weld joint;

f. providing an alloy of the foregoing type which has improved intrinsic corrosion resistance;

g. providing an alloy of the foregoing type which has improved corrosion resistance when assembled into a finished battery.

h. providing an alloy of the foregoing type which has improved tolerance to high temperature welding conditions; and i. providing an alloy of the foregoing type which retains minimum void volume, acceptable nut rotation torque, weld torque, and weld current range.

BRIEF SUMMARY OF THE INVENTION

The shortcomings of the prior art and the objects of the invention are accomplished in one aspect by an alloy for use in casting a lead-acid battery terminal which is composed of antimony which is present in the range of about 2.5–4.75%; arsenic present in the range of about 0.15–0.35%; and tin present in the range of about 0.2–0.6%, the percentages being based upon the total weight of the lead-based alloy. Copper is present in the range of about 0–200 ppm, and sulfur is present in the range of about 0–40 ppm. The balance of the alloy is essentially lead.

In a preferred embodiment, antimony is present in the alloy in the range of about 2.75–3.25%; arsenic is present in the range of 0.18–0.28%; and tin is present in the range of about 0.20–0.35%, the percentages being based upon the total weight of the lead-based alloy. Copper is present in the range of about 0–100 ppm, and sulfur is present in the range of about 0–40 ppm. The balance of the alloy is essentially lead.

In a more preferred embodiment, antimony is present in the alloy in an amount of about 3.0%; arsenic is present in an amount of about 0.2%; and tin is present in an amount of about 0.3%. Copper is present in an amount of less than about 50 ppm and sulfur is present in an amount of less than about 15 ppm. Such copper and sulfur ranges are background concentrations which are typically found in smelted lead.

In an alternative embodiment, copper and sulfur are not present in the alloy above such typical background concentrations and the alloy further includes selenium in a range of about 40–90 ppm.

In another aspect, there is a side terminal for a lead acid storage battery comprising a fastening member and a bushing surrounding the nut member. The bushing is molded into a side wall of the battery and is composed of an alloy comprising about 2.5–4.75% antimony; about 0.15–0.35% arsenic; and about 0.2–0.6% tin. Copper is present in the range of about 0–200 ppm, and sulfur is present in the range of about 0–40 ppm. The balance is essentially lead.

In another preferred embodiment, the fastening member of the side terminal is a nut and the side terminal is connected to a wall of a lead-acid storage battery which has a container composed of polypropylene.

In the description, reference is made to the accompanying drawings which form a part hereof, and in which there is shown by way of illustration preferred embodiments of the invention. Such embodiments do not necessarily represent the full scope of the invention. Therefore, reference is made to the claims herein for interpreting the scope of the invention.

DETAILED DESCRIPTION

Figure 1:
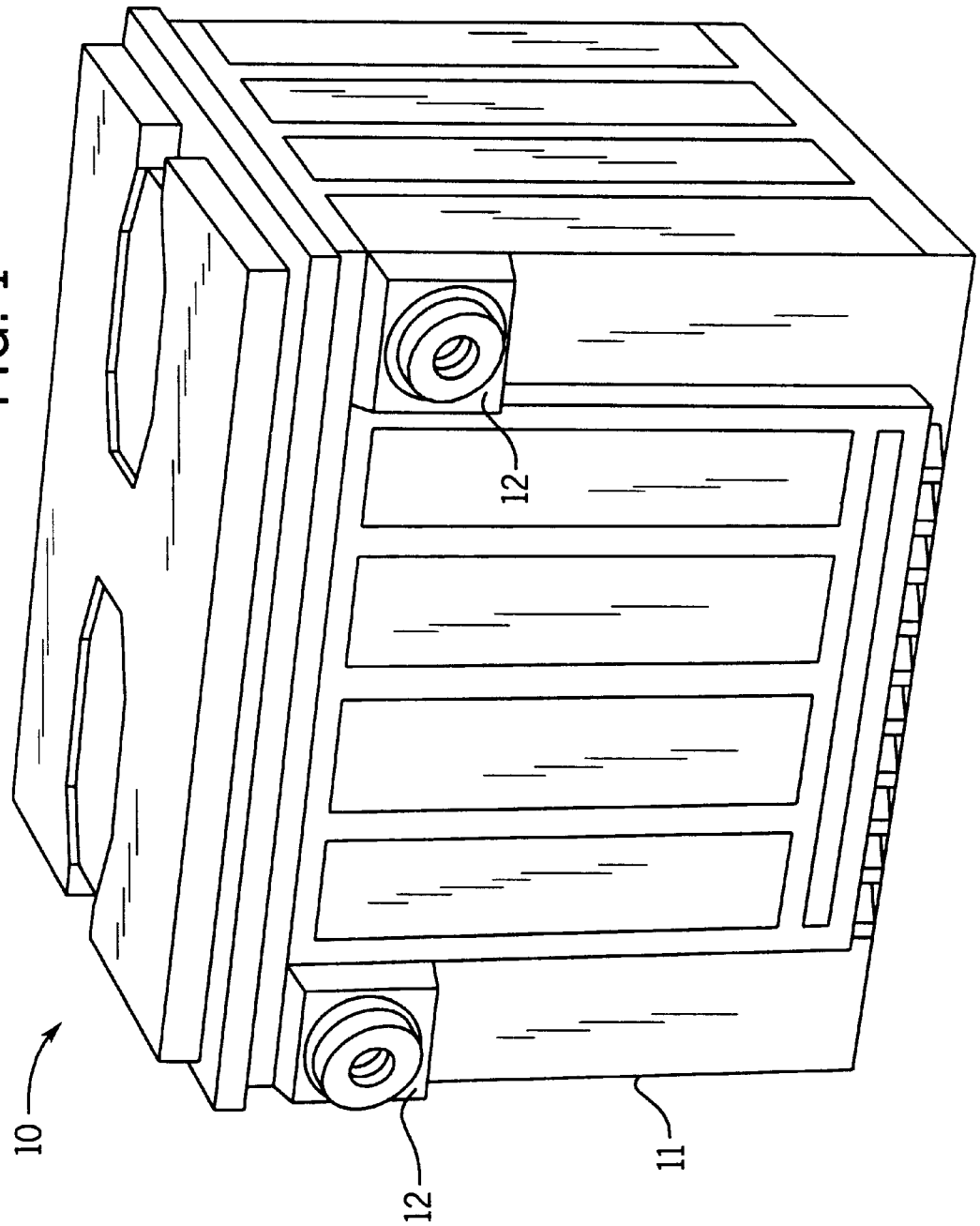
FIG. 1 is a perspective view of a lead-acid battery container with side terminals composed of the alloy of this invention.

The corrosion failures of a side terminal joint are expected to drop as much as 90% through the use of this alloy. The success of this alloy is attributed to reduction of copper (catalyst for poly decomposition the products of which increase lead alloy corrosion), increased tin (poly antioxidant protection), increased arsenic (hardness recovery at increased tin content for resistance to corrosion, induced stresses and retains other mechanical requirements of the terminal), and reduction of sulfur (improved composition stability during casting). As arsenic is increased from its minimum of 0.15%, for every 0.01% increase in arsenic, tin is increased by 0.01% until a maximum of 0.35% is reached at which point tin can increase up to 0.6% with no further increase in arsenic preferred. The improved alloy of the invention has been optimized to preserve nut rotation and weld torque performance within currently acceptable ranges. Weldability and age hardening have not been adversely affected.

The alloys of the present invention may be produced in the conventional manner by adding the constituents to molten lead in the prescribed amounts and mixing to obtain a homogenous melt. In a preferred manner, 3.0% antimony, 0.3% tin, 0.2% arsenic, 0.005% copper, and 0.0015% sulfur are in the molten lead. Note that copper and sulfur are normally present in secondary lead at no more than these concentrations. Therefore, they are either added to or not refined from the molten lead to attain such concentrations. The percentages are based upon the total weight of the lead alloy. A preferred method for casting the alloy of this invention is die casting.

Bench marking analyses of several side terminal alloys, regardless of the tombstone-terminal design, were conducted for elemental composition, polypropylene interaction, and limited tank corrosion resistance. The results are summarized in attached Table 1.

TABLE 1

Competitive Side Terminal Alloy Comparison

| Alloy | Antimony % | Arsenic % | Tin % | Copper PPM | Sulfur PPM | Selenium PPM | Poly Degrad |
|---|---|---|---|---|---|---|---|
| A | 3.05 | 0.167 | 0.125 | 67 | <1 | 132 | Moderate |
| B | 2.8 | 0.12 | 0.13 | 300 | <5 | <20 | Severe |
| C | 3.1 | 0.195 | 0.43 | 207 | 80 | <20 | Severe |
| D | 4.6 | 0.125 | 0.24 | 621 | 22 | <20 | Moderate |
| E | 3.2 | 0.206 | 0.21 | 576 | 68 | <20 | Moderate |
| F | 4.5 | 0.112 | 0.23 | 117 | 86 | <20 | Slight |
| G | 3.1 | 0.036 | 0.43 | 24 | 19 | <20 | Minimal (best) |
| H | 3.0 | 0.200 | 0.30 | <100 | <40 | <20 | Slight |

Most notable of the group was the low incidence of corrosion related failure in the G alloy compared to the D alloy, which were both of similar construction. The superior performance of the G alloy was attributed to the high tin and very low copper concentrations observed.

A range of alloys were prepared in standard side terminal bushings (FIG. 2) to evaluate overall performance from molding through welding and corrosion testing. During this process, a series of parameters were observed to assess the suitability of varied alloys through processing. The parameters and results are summarized on the following Tables 2–4. Tables 2 and 3 set forth the composition of eight alloys numbered 1–8. Alloys 1 and 5 represent benchmark or comparative alloys. Alloy 2 is the alloy of this invention. Table 4 sets forth the tests conducted and observations made.

Alloy 1 is an alloy of the prior art. Alloy 2 is an exemplary alloy of the present invention. Alloy 3 is a competitive alloy. Alloy 4 is a high arsenic version of alloy 3. Alloy 5 is an experimental high tin alloy. Alloy 6 is an experimental high antimony alloy. Alloys 7 and 8 are also experimental alloys.

In addition to the observations and comments made in Table 4, the following observations are made with respect to the indicated testing:

Void Volume: All within specification of <1%.

Nut Rotation: The numbered designations show torque values and are in terms of inch-pounds. All are within existing specification, except for alloy 5.

Weld Torque: The Current Range is in terms of amps. Torque values are expressed as in-lb. All are within existing specification for immediately after welding.

Metallography: Slightly coarser grain structure with improved alloy 2 when compared to benchmark alloy 1.

Poly Oxidation: Polypropylene in contact with 2% tin alloy demonstrated no visible discoloration/oxidation over a two week period at 150° C. and is believed to impart protective qualities to polypropylene at elevated temperatures. The 2% tin alloy 5 is not suitable for side terminal use due to its inherent softness, but was chosen for test based on perceived superior corrosion resistance. The improved alloy 2 ranked third of the viable candidate alloys in this test based on time to discoloration and extent of discoloration at fixed intervals.

Coupon Corrosion: Of the four alloys tested, the intrinsic corrosion of the improved alloy 2 was significantly less than the benchmark alloy 1 or alloy 3. The improved alloy 2 was comparable to alloy 4. Intrinsic corrosion assesses the corrosion rate of the as cast alloy.

Tank Corrosion: Improved alloy 2 demonstrated a single failure (6%) in a relatively high temperature/high amperage weld. Its composition is believed to provide improved tolerance to higher temperature welding extremes then the other alloys examined. Failure rates between 53% and 26% for standard alloy 1 composition and 47% for alloy composition 7 were found. Results for alloys 3 and 4 exhibited failure rates of 25–26% with sensitivity to high welding temperatures and/or scattered results. Tank corrosion assesses the corrosion induced failures of the fully processed terminal, including poly molding, brushing, and welding.

Conversion Factors: For purposes of converting percentages to ppm or ppm to percentages, the following equations can be employed:

$$\%\times 10{,}000 = \text{ppm}$$

$$\text{ppm}/10000 = \%$$

TABLE 2

Alloy Test Plan

|    | 1 Nom | +/-   | 1a Meas. | 1b Meas. | 1c Meas. | 2 Nom | +/-   | Meas.  | 3 Nom | +/-  | Meas.  | 4 Nom | +/-  | Meas   |
|----|-------|-------|----------|----------|----------|-------|-------|--------|-------|------|--------|-------|------|--------|
| Sb | 3.00  | 0.25  | 2.76     | 3.05     | 3.08     | 3.00  | 0.25  | 2.96   | 3.25  | 0.25 | 3.05   | 3.25  | 0.25 | 2.95   |
| Sn | 0.275 | 0.125 | 0.277    | 0.251    | 0.236    | 0.300 | 0.100 | 0.273  | 0.45  | 0.05 | 0.401  | 0.45  | 0.05 | 0.399  |
| As | 0.125 | 0.075 | 0.133    | 0.135    | 0.137    | 0.200 | 0.05  | 0.194  | 0.05  | max  | 0.029  | 0.290 | 0.05 | 0.211  |
| Cu | 0.050 | 0.010 | 0.048    | 0.043    | 0.047    | 0.005 | max   | 0.0022 | 0.005 | max  | 0.0019 | 0.005 | max  | 0.0018 |
| S  | 0.0055| 0.003 | 0.0028   | 0.0016   | 0.0019   | 0.002 | max   | 0.0022 | 0.002 | max  | 0.0016 | 0.002 | max  | <.0005 |
| Se |       |       |          |          |          |       |       |        |       |      |        |       |      |        |
| Ag | 0.01  | max   | 0.002    | 0.003    | 0.003    | 0.01  | max   | 0.0009 |       |      | 0.0013 |       |      | 0.0013 |

TABLE 3

Alloy Test Plan (Continued)

|    | 5 Nom   | +/-  | Meas.   | 6 Nom | +/-   | Meas.  | 7 Nom  | +/-    | Meas.  | 8 Nom  | +/-    | Meas.  |
|----|---------|------|---------|-------|-------|--------|--------|--------|--------|--------|--------|--------|
| Sb | <.0010  | 0    | 0.0025  | 4.25  | 0.25  | 4.23   | 3.00   | 0.25   | 3.01   | 3.100  | 0.150  | 2.92   |
| Sn | 2.00    | 0.05 | 2.109   | 0.300 | 0.100 | 0.283  | 0.300  | 0.100  | 0.309  | 0.1250 | 0.0250 | 0.148  |
| As | <.0005  | 0    | <.0005  | 0.200 | 0.05  | 0.206  | 0.125  | 0.075  | 0.121  | 0.1500 | 0.0500 | 0.155  |
| Cu | <.0010  | 0    | 0.00054 | 0.005 | max   | 0.003  | 0.0175 | 0.0075 | 0.017  | 0.0200 | max    | 0.0059 |
| S  | <.005   | 0    | <.0005  | 0.002 | max   | <.002  | 0.004  | max    | <.0005 | 0.0015 | max    | <.005  |
| Se |         |      |         |       |       |        |        |        |        | 0.0100 | 0.003  | 0.0064 |
| Ag | <.0050  |      | 0.0034  |       |       | <.0024 |        |        | <.0024 |        |        | 0.0020 |

TABLE 4

Summary of Experimental Results

|  | 1 | 2 | 3 | 4 | 5 | 6 | 7 | 8 |
|---|---|---|---|---|---|---|---|---|
| Void Volume | 0.64 | 0.52 | 0.86 | 0.82 | 0.38 | 0.94 | 0.43 | 0.52 |
| Nut Rotation |  |  |  |  |  |  |  |  |
| 1 hr after casting (in-lb before nut rotation) | 191 | 192 | 165 | 196 | 100 | No data | 175 | 173 |
| Weld |  |  |  |  |  |  |  |  |
| Current Range (amps) | 800 | 500 | 800 | 500 | no data | no data | 500 | no data |
| Torque-fresh (in-lb to break assembly) | 90 | 81 | 85 | 88 | 86.5 | 93.2 | no data | 88.7 |
| Metallography | Benchmark | coarser | similar | coarser | similar/ larger grain structure | similar | coarser | finest |
| Corrosion Alloy | Benchmark | best | worse | similar | no data | no data | similar | no data |
| Coupon corrosion | Benchmark | Better | Similar | Better | no data | no data | no data | no data |
| Poly Oxidation Rank (2 weeks) 1 = best, 6 = worst | 6th | 3rd | 2nd | 2nd | 1st | 4th | 5th | 4th |

While the alloy of this invention has been described for use with a side terminal battery, it can be employed with all lead-acid battery terminals including top posts, marine, and flag types. The improved alloy described is suitable for any die cast termination, as well as gravity casting. This broad application is important, as many bushing/terminal sources use common lead pots to feed various molding dies. With multiple alloys, potential for increased part costs exists if casting pot alloy must be changed frequently to manufacture different parts.

Although the incorporation of grain refiners, such as copper and sulfur, are not specifically needed for bushing quality and are generally undesirable in the die cast process, evidence indicates that the inclusion of selenium will assist in producing a desirable fine grained weld without the detrimental effects of copper and sulfur at levels required for grain refinement as described in the prior art. A practical working concentration of 50–70 ppm Se in die cast processes is feasible and produces desired results. The lower level is set well above background to provide grain refinement. The upper limit is set at a level below that which causes poly degradation and associated corrosion and by excessive drossing in the die cast process. Accordingly, a range of 40–90 ppm selenium can be employed for die cast terminals.

Figure 2:
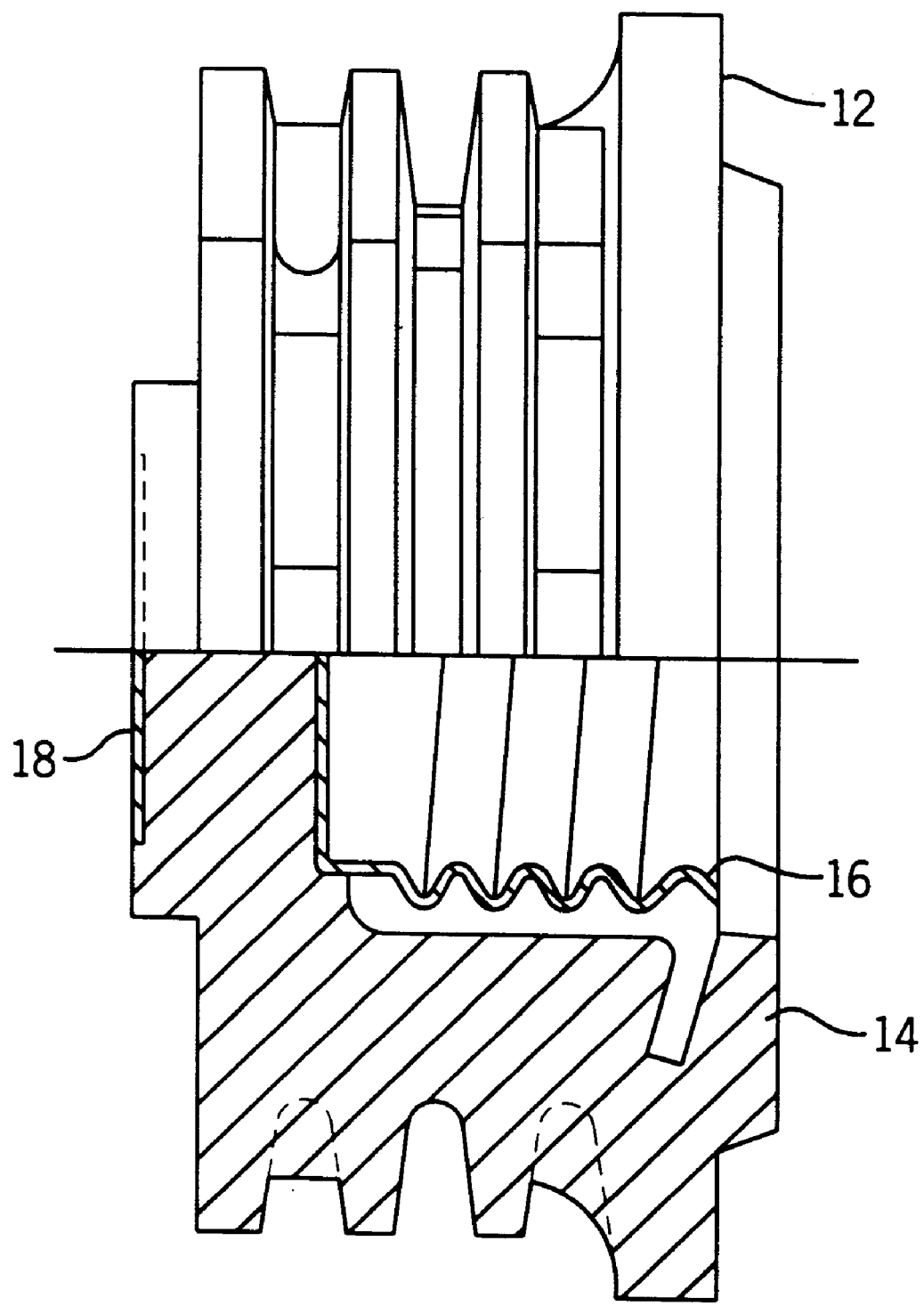
FIG. 2 is a view in partial cross-section of one of the side terminals shown in FIG. 1.

Referring to FIG. 1 of the drawing, there is shown a lead-acid battery 10 which includes a polypropylene container 11 with side terminals 12. One of the side terminals is illustrated in FIG. 2 and has a bushing 14 into which is secured a stainless steel nut 16. A weld button 18 is provided at the back for attachment to the usual tombstone joint. The bushing is composed of the alloy of this invention.

INDUSTRIAL APPLICABILITY

An alloy composition is provided for lead-acid battery terminals which alloy composition affords a reduction of dross in manufacturing; improved corrosion resistance as well as resistance to polypropylene degradation and other improved features.

What is claimed is:

1. A lead-acid battery terminal prepared from an alloy, the alloy comprising:
   antimony present in the range of about 2.5–4.75%;
   arsenic present in the range of about 0.15–0.35%;
   tin present in the range of about 0.23–0.6%, the percentages being based upon the total weight of said alloy;
   copper present in the range of about 0–200 ppm;
   sulfur present in the range of about 0–40 ppm; and
   the balance being essentially lead.

2. The lead-acid battery terminal as defined in claim 1, wherein:
   antimony is present in the alloy in the range of about 2.75–3.25%;
   arsenic is present in the alloy in the range of about 0.18–0.28%;
   tin is present in the alloy in the range of 0.25–0.35%; and
   copper is present in the alloy in the range of about 0–100 ppm.

3. The lead-acid battery terminal as defined in claim 1, wherein:
   antimony is present in the alloy in an amount of about 3.0%;
   arsenic is present in the alloy in an amount of about 0.2%;
   tin is present in the alloy in an amount of about 0.3%;
   copper is present in the alloy in an amount of about 50 ppm; and
   sulfur is present in the alloy in an amount of about 15 ppm.

4. The lead-acid battery terminal as defined in claim 1, wherein copper and sulfur are not present in the alloy, and the alloy further includes selenium in a range of about 40–90 ppm.

5. The lead-acid battery terminal as defined in claim 1, wherein:
   copper is present in the alloy in the range of about 0–100 ppm.

6. The lead-acid battery terminal as defined in claim 1, wherein:
   copper is present in the alloy in the range of about 0–50 ppm.

7. A side terminal for a lead acid storage battery comprising:
   a fastening member;
   a bushing surrounding the fastening member;
   the bushing prepared from an alloy comprising:
      antimony present in the alloy in the range of about 2.5–4.75%;
      arsenic present in the alloy in the range of about 0.15–0.35%;
      tin present in the alloy in the range of about 0.23–0.6%, the percentages being based upon the total weight of said alloy;
      copper present in the alloy in the range of about 0–200 ppm;
      sulfur present in the alloy in the range of about 0–40 ppm; and
      the balance being essentially lead.

8. The side terminal as defined in claim 7, wherein:
   the alloy comprises antimony present in the alloy in the range of about 2.75–3.25%;
   arsenic present in the alloy in the range of about 0.18–0.28%;
   tin present in the alloy in the range of about 0.25–0.35%; and
   copper present in the alloy in the range of about 0–100 ppm.

9. The side terminal as defined in claim 7, wherein the alloy comprises:
   antimony present in the alloy in an amount of at least 3.0%;
   arsenic present in the alloy in an amount of about 0.2%;
   tin present in the alloy in an amount of about 0.3%;
   copper present in the alloy in an amount of less than about 50 ppm; and
   sulfur present in the alloy in an amount of about 15 ppm.

10. The side terminal as defined in claim 7, wherein the fastening member is a nut.

11. The side terminal as defined in claim 7, wherein the side terminal is connected to a wall of the lead-acid storage battery.

12. The side terminal as defined in claim 11, wherein the wall is composed of polypropylene.

13. The side terminal as defined in claim 7, wherein copper and sulfur are essentially not present in the alloy, and the alloy further includes selenium in a range of about 40–90 ppm.

14. The side terminal as defined in claim 7, wherein:
   copper is present in the alloy in the range of about 0–100 ppm.

15. The side terminal as defined in claim 7, wherein:
   copper is present in the alloy in the range of about 0–50 ppm.

16. A method for forming a lead-acid battery terminal, the method comprising:
   die casting an alloy, the alloy comprising about 2.5–4.75% antimony, about 0.15–0.35% arsenic, about 0.23–0.6% tin, about 0–200 ppm copper, and about 0–40 ppm sulfur, the percentages being based upon the total weight of the alloy, the balance of the alloy being essentially lead.

17. The method of claim 16 wherein:
the alloy comprises less than 100 ppm copper.

18. The method of claim 16 wherein:
the alloy comprises less than 50 ppm copper.

19. The method of claim 16 wherein:
the alloy further comprises about 40–90 ppm selenium.

* * * * *